3,346,545
OLEFINICALLY UNSATURATED PHOSPHATE AND PHOSPHONATE MONOMERS AND PROCESS FOR MAKING SAME AND POLYMERS THEREFROM

Eugene J. Sehm, Akron, Ohio, assignor to The B. F. Goodrich Company, New York, N.Y., a corporation of New York
No Drawing. Filed Oct. 30, 1964, Ser. No. 407,899
15 Claims. (Cl. 260—89.5)

ABSTRACT OF THE DISCLOSURE

The reaction in the presence of a hydrogen halide remover of a compound of the formula

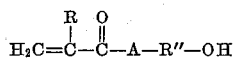

wherein R is hydrogen, methyl, chlorine, bromine or fluorine; A is

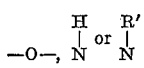

wherein R′ is an alkyl group having from 1 to 4 carbon atoms; R″ is a straight chain, branched or cyclic bivalent hydrocarbon radical having from 1 to 6 carbon atoms, and of a compound of the formula

wherein X is chlorine, bromine or fluorine and Y is chlorine, bromine, fluorine, an alkyl radical having from 1 to 6 carbon atoms, or an aryl radical having from 6 to 10 carbon atoms forms a polymerizable monomer having the formula

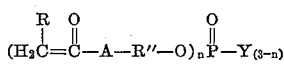

wherein $n$ is 2 or 3. The polymerized homopolymers of these monomers are strong, flame resistant, thermosetting polymers. The monomers are copolymerizable with one or more other monomers to form copolymers or interpolymers.

---

This invention relates to polymerizable monomers prepared from (1) an acrylate ester, a methacrylate ester, a N-substituted acrylamide, or a N-substituted methacrylamide having substituted thereon a reactive hydroxyl group and (2) a phosphorus oxyhalide, an alkyl phosphonyl dihalide or an aryl phosphonyl dihalide; to a process for the preparation thereof; and to polymers prepared therefrom.

The new monomers of this invention can be polymerized alone to form a strong, flame resistant, thermosetting polymer. The materials when cured have good adhesion to such common materials as wood, metals and ceramics. As a result of their flame resistant and adhesive properties these strong polymers have particularly valuable application as building materials. The polymers, thus, may be laminated as panels with metals or molded into various products having either decorative or protective utility. The monomers of this invention may be copolymerized with other monomers in order to harden the other monomers and improve their flame resistance. By reason of the monomers of this invention having di or tri functional olefinic unsaturation the monomers may be incorporated with other monomers as a cross-linking agent.

The monomers of this invention are readily polymerizable either alone or in admixture with one or more other monomers. Thus, copolymers and interpolymers may be formed by copolymerizing the monomers of this invention with such monomers as the vinyl halides, the acrylate and methacrylate esters, the dienes and substituted dienes, the vinyl cyanides, the maleate and fumarate esters, the vinyl esters, the vinyl aldehydes, the vinyl amides, the vinyl carboxylic acids, the vinyl pyridines, the vinyl aromatics and substituted aromatics, the monoolefins, the vinyl ethers, the allyl esters and ethers, and the vinyl ketones.

The principal reaction involved in the formation of the monomers is shown by the following equation:

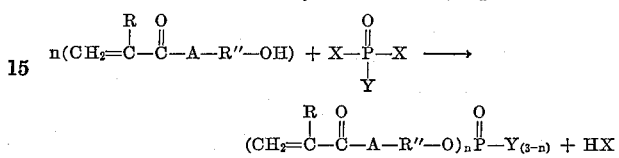

wherein R is a member selected from the group comprising hydrogen, methyl, chlorine, bromine and fluorine; A is a member selected from the group consisting of

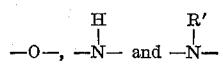

wherein R′ is an alkyl group having from 1 to 4 carbon atoms; R″ is a straight chain, branched, or cyclic bivalent hydrocarbon radical having from 1 to 6 carbon atoms; Y is a member selected from the group comprising chlorine, bromine, fluorine, an alkyl radical having from 1 to 6 carbon atoms, and an aryl radical having from 6 to 10 carbon atoms; X is a member selected from the group comprising chlorine, bromine, and fluorine; $n$ is an integer between two and three.

Examples of the reactant which can be selected from the group comprising acrylate esters, methacrylate esters, N-substituted acrylamides and N-substituted methacrylamides and which contains a reactive hydroxyl group are represented by the formula

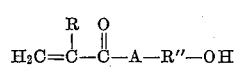

wherein R is a member selected from the group comprising hydrogen, methyl, chlorine, bromide and fluorine; A is a member selected from the group consisting of

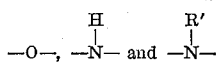

wherein R′ is an alkyl group having from 1 to 4 carbon atoms; and R″ is a straight chain, branched or cyclic bivalent hydrocarbon radical having from 1 to 6 carbon.

The following are examples:

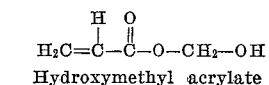
Hydroxymethyl acrylate

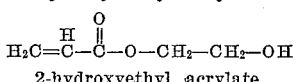
2-hydroxyethyl acrylate

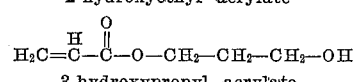
3-hydroxypropyl acrylate

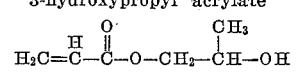
2-hydroxypropyl acrylate

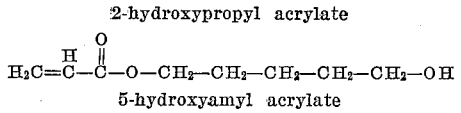
5-hydroxyamyl acrylate

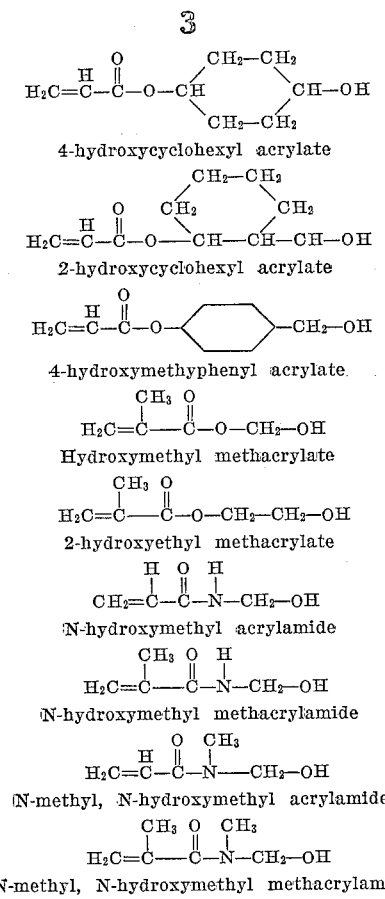

4-hydroxycyclohexyl acrylate 2-hydroxycyclohexyl acrylate 4-hydroxymethyphenyl acrylate Hydroxymethyl methacrylate 2-hydroxyethyl methacrylate N-hydroxymethyl acrylamide N-hydroxymethyl methacrylamide N-methyl, N-hydroxymethyl acrylamide N-methyl, N-hydroxymethyl methacrylamide The phosphorus compounds that are useful in preparing the monomers of this invention, as aforeshown, have the general formula:

wherein X is a member selected from the group comprising chlorine, bromine, and fluorine and Y is a member selected from the group comprising chlorine, bromine, fluorine and an alkyl radical having from 1 to 6 carbon atoms and an aryl radical having from 6 to 10 carbon atoms. Examples of such compounds are as follows:

phosphorus oxychloride,
phosphorus oxybromide,
phosphorus oxyfluoride,
phosphorus oxydichloride bromide,
phosphorus oxydibromide chloride,
methyl phosphonyl dichloride,
chloromethyl phosphonyl dichloride,
methyl phosphonyl dibromide,
methyl phosphonyl difluoride,
methyl phosphonyl chloride bromide,
ethyl phosphonyl dichloride,
propyl phosphonyl dichloride,
isopropyl phosphonyl dichloride,
the butyl phosphonyl dichlorides,
the amyl phosphonyl dichlorides,
the hexyl phosphonyl dichlorides,
cyclohexyl phosphonyl dichloride,
phenyl phosphonyl dichloride,
o-tolyl phosphonyl dichloride,
m-tolyl phosphonyl dichloride,
p-tolyl phosphonyl dichloride,
the xylyl phosphonyl dichlorides,
benzyl phosphonyl dichloride,
the naphthyl phosphonyl dichlorides.

The aliphatic and aromatic phosphonyl dihalogens may be substituted on the aliphatic and aromatic portions of the compounds with any chemical group that does not interfere with the reaction of the halides of the phosphorus compounds with the hydroxyl groups of the other reactant.

Typical examples of the new monomers that are formed are as follows:

Typical monomers formed when $n$ is three:

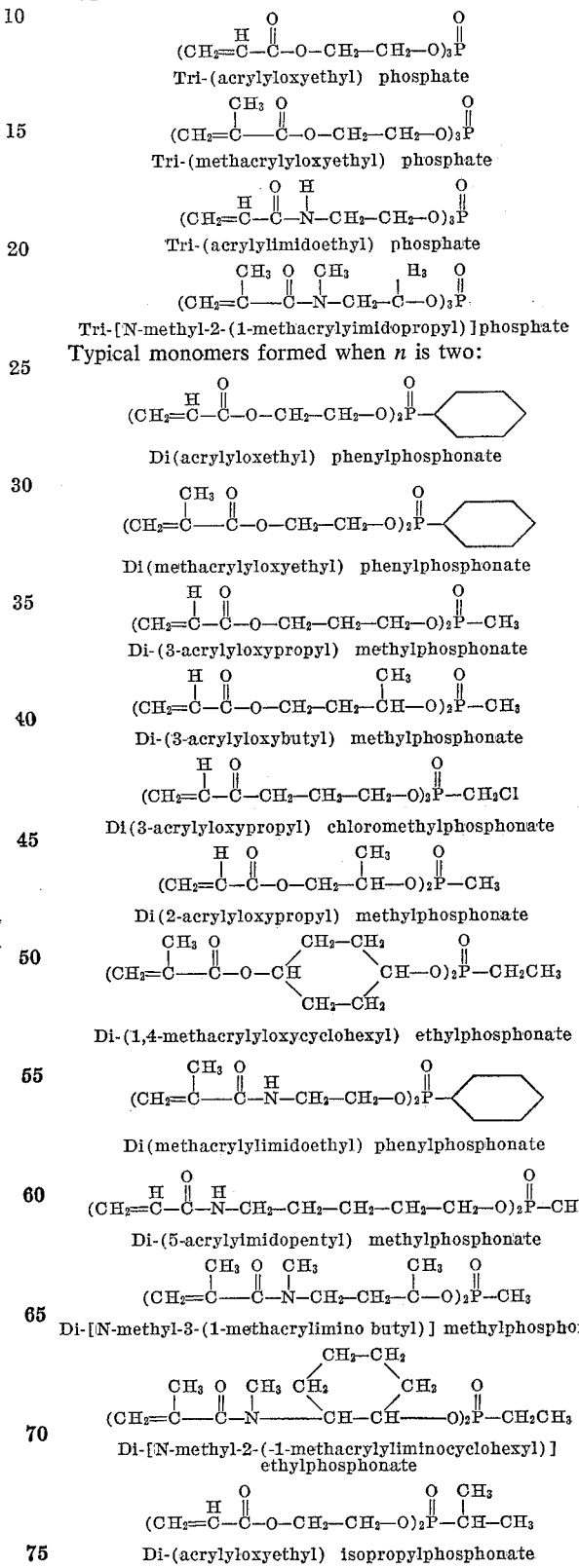

Tri-(acryloxyethyl) phosphate

Tri-(methacrylyloxyethyl) phosphate

Tri-(acrylylimidoethyl) phosphate

Tri-[N-methyl-2-(1-methacrylylimidopropyl)]phosphate

Typical monomers formed when $n$ is two:

Di(acryloxethyl) phenylphosphonate

Di(methacrylyloxyethyl) phenylphosphonate

Di-(3-acrylyloxypropyl) methylphosphonate

Di-(3-acrylyloxybutyl) methylphosphonate

Di(3-acrylyloxypropyl) chloromethylphosphonate

Di(2-acrylyloxypropyl) methylphosphonate

Di-(1,4-methacrylyloxycyclohexyl) ethylphosphonate

Di(methacrylylimidoethyl) phenylphosphonate

Di-(5-acrylylimidopentyl) methylphosphonate

Di-[N-methyl-3-(1-methacrylimino butyl)] methylphosphonate

Di-[N-methyl-2-(-1-methacrylyliminocyclohexyl)] ethylphosphonate

Di-(acrylyloxyethyl) isopropylphosphonate

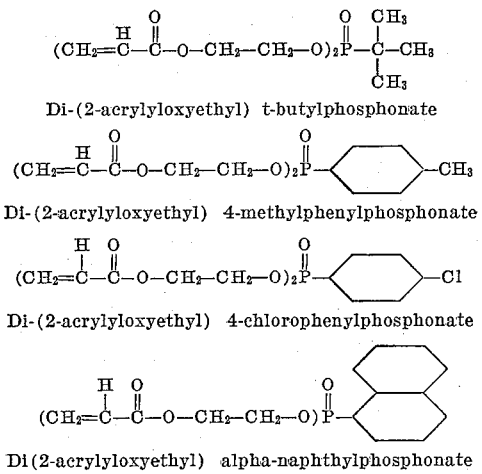

Di-(2-acrylyloxyethyl) t-butylphosphonate

Di-(2-acrylyloxyethyl) 4-methylphenylphosphonate

Di-(2-acrylyloxyethyl) 4-chlorophenylphosphonate

Di(2-acrylyloxyethyl) alpha-naphthylphosphonate

The monomers of this invention can be prepared merely by adding one of the reactants slowly to the other reactant. Desirably, the addition of the one reactant to the other reactant is carried out slowly in order to permit better control to be maintained over the reaction. Although a slight excess of either starting material is tolerable, stoichiometric proportions are preferred for the ease of ultimate purification.

It has been found desirable in preparing the monomer of this invention first to dissolve the two reactants in an inert common solvent for the two reactants before adding one of the reactants to the other reactant. Although a common solvent for the two reactants is preferable, a different solvent for each reactant could be used if the two solvents are compatible upon mixing. Suitable inert solvents for the two reactants that have been found to be particularly useful are benzene, toluene and chloroform.

The reaction temperature is not critical. Generally the reaction may be carried out in a temperature range from below 0° C. to 150° C. or higher. Care must be taken at higher temperatures so that the polymerization does not occur through the olefinic double bonds. If such danger exists, a polymerization inhibitor useful for inhibiting polymerization of the olefinically unsaturated reactants of this invention may be used. Typical polymerization inhibitors useful for this purpose include p-methoxyphenol, p-hydroxydiphenylamine, 2,5-di-tert-butylhydroquinone and 1,3,5-trinitrobenzene.

It is preferred to mix the reactants at a temperature below 25° C. and subsequently to carry out the reaction between 50 to 75° C. In carrying out the reaction at a temperature between 50 to 75° C. the reaction rate of the two reactants is satisfactory and danger of polymerization or an uncontrollable reaction is greatly reduced. Since most of the reactions are exothermic, external cooling of the reaction vessel generally is necessary.

When the reactants combine, a hydrogen halide is produced as a reaction product. It is desirable to remove this by-product with a hydrogen haiide remover to promote the reaction and to eliminate any side reactions which might be caused by the presence of the hydrogen halide. The hydrogen halide by-product can be removed by various known techniques. One technique is to pass an inert gas such as nitrogen through the reaction mixture. When this procedure for removing the hydrogen halide from the batch is used, the removal of the liberated hydrogen halide may be faciliated by carrying out the reaction at reduced pressure. Another method for "removing" the hydrogen halide as such which has been found useful in the practice of this invention is to chemically combine the hydrogen halide with a hydrogen halide acceptor such as pyridine, triethyl amine, dimethyl aniline and the like. An amount of hydrogen halide acceptor just necessary to combine with the liberated hydrogen halide is sufficient. Thus, for example, when two moles of a hydroxyl containing compound are reacted with one mole of a substituted phosphonyl dihalide and two moles of hydrogen halide are liberated, two moles of an hydrogen halide acceptor should be added in order just to remove the hydrogen halide formed. In practice, it generally is preferred to use a slight excess of the hydrogen halide acceptor to insure that there is a sufficient amount of the acceptor in the charge to combine with all of the hydrogen halide produced by the reaction. Although an excess of the hydrogen halide acceptor is preferred, a deficiency is permissible. The term "hydrogen halide remover" will be hereinafter used to designate the various means of removing or inactivating the liberated hydrogen halide.

After completion of the reaction, the salt formed by the reaction of the hydrogen halide and the hydrogen halide acceptor when a hydrogen halide acceptor was used, is removed by filtration. It is preferable to add additional inert solvent to the reaction product to facilitate transferring of the reaction product during this filtration step. The inert solvent is also used to wash the filter cake. Next a high boiling polymerization inhibitor useful for inhibiting polymerization of the olefinic double bonds of the new monomers may be added, if it has not been added in a previous step. Examples of such useful inhibitors are as aforesaid listed. Next water soluble materials are removed by washing with water. The amount of water is not critical, but generally an amount equal to about half the volume of inert solvent has been found useful. After the water has been added, the system is slowly stirred at the solvent-water interface followed by separation of the materials. The water washing is usually repeated 4 or 5 times. After the last washing, any remaining water may be removed by briefly shaking the solvent solution with a sequestating agent such as anhydrous magnesium sulfate following by filtration. The addition of a sequestating agent is desirable, but not necessary since water is removed with the solvent upon distillation of the solvent in the following step. Finally the solvent is removed by distillation. A convenient method to remove the solvent is to distil the solvent under vacuum at room temperature, then followed by distillation at 50 to 60° C. for about 30 minutes. The distillation at the elevated temperature removes any remaining solvent from the new monomers. After the distillation step the monomers are weighed to determine the yield and subjected to suitable tests to verify the structure of the monomers. Such tests include infrared analysis, carbon, hydrogen, and phosphorus analysis. Nitrogen analysis for those monomers that contain nitrogen and chlorine analysis for those monomers that contain chlorine may also be performed. The molecular weight may also be determined by conventional methods and compared to the theoretical molecular weights of the new monomers.

This invention is illustrated by the following examples:

EXAMPLE I

To a flask equipped with a stirrer and a nitrogen sweeping tube, 260 grams (2 moles) 2-hydroxyethylmethacrylate, 162 grams (2.05 moles) pyridine and 150 ml. benzene were added. A solution of 195 grams (1 mole) of phenyl phosphonyl dichloride in 100 ml. benzene was then added to the flask over a period of 45 minutes at a temperature below 25° C. with stirring. The temperature during this addition was maintained with the aid of the external cooling of an ice bath. The reaction mixture, after the addition, was stirred an additional 20 minutes at room temperature followed by stirring for 30 minutes at 60° C. The reaction mixture was next cooled. To aid in removing the reaction product from the flask, 425 ml. of benzene were added to the product. The product was next filtered, followed by the addition of 0.2 gram of p-methoxy phenol, a polymerization inhibitor, to the filtrate. The reaction product was then washed with 300–400 ml. water a total of 5 times. After the final wash, a small amount of magnesium sulfate was added to remove any traces of water and was subsequently removed by filtration. The benzene was next removed by distillation under vacuum at room temperature for 35 minutes, followed by vacuum distillation at 50°–60° C. for 30 minutes. A hazy off-white liquid was obtained, a conversion of 94 percent was calculated, based upon the weight of the final product, di-(2-methacrylyloxyethyl) phenylphosphonate,

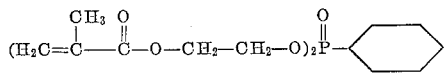

The above procedure was repeated, but on a smaller scale. The resulting di-(2-methacrylyloxyethyl) phenylphosphonate was analyzed as follows:

| Type of Determination | Theory | Found |
|---|---|---|
| C, percent by weight | 56.54 | 55.30 |
| H, percent by weight | 6.06 | 6.01 |
| P, percent by weight | 8.10 | 7.97 |
| Molecular weight | 382.3 | 385.±1 |

EXAMPLE II

The general procedure of Example I was used. A solution of 51.1 g. (0.33 mole) of phosphorus oxychloride in 40 ml. benzene was added to a solution of 130 grams (1 mole) 2-hydroxyethylmethacrylate and 83 grams (1.05 moles) pyridine in 60 ml. benzene over a period of 28 minutes at a temperature below 25° C. The reaction mixture was then stirred for 15 minutes at room temperature, then for 15 minutes at 60° C. The reaction mixture was then cooled, filtered and diluted with an additional 180 ml. benzene. This solution was then washed with 200 ml. water a total of 5 times. 0.15 g. of p-methoxyphenol was added before the benzene was a vacuum distilled at room temperature for 40 minutes, followed by 50° C. distillation for 105 minutes.

A conversion of 94%, based upon the weight of the final product, was calculated for the final product, tri-(methacrylyloxyethyl) phosphate

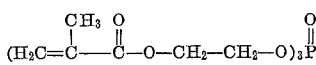

Analysis of the product was as follows:

| Type of Determination | Theory | Found |
|---|---|---|
| C, percent by weight | 49.77 | 48.84 |
| H, percent by weight | 6.27 | 6.27 |
| P, percent by weight | 7.13 | 6.83 |
| Molecular weight | 434.4 | 437.±3 |

EXAMPLE III

The general procedure of Example I was again followed. A solution of 17.0 grams (0.101 mole) of chloromethyl phosphonyl dichloride in 20.0 ml. benzene was added to a solution of 26.4 grams (0.203 mole) 2-hydroxymethylmethacrylate and 16.6 grams (0.21 mole) pyridine in 30 ml. anhydrous benzene over a period of 13 minutes with stirring at a temperature below 25° C. The reaction mixture was then stirred for 34 minutes at room temperature. Then the reaction was heated to 50° C., followed by cooling to room temperature. This heating and cooling took 6 minutes. The reaction mixture was then further cooled and filtered to remove pyridine hydrochloride. This solution was then washed with water 5 times. The benzene was then removed by vacuum distillation from the mixture to yield 24.7 grams of a hazy product having 88.16 percent purity based upon unsaturation. This hazy product was washed with a sodium hydrogen carbonate solution and then dried over anhydrous magnesium sulfate. This purified product di-(2-methacrylyloxyethyl) chloromethyl phosphonate

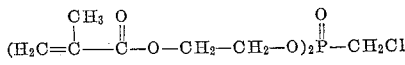

was found to be 93.5 percent pure based upon unsaturation.

Analysis of the product was as follows:

| Type of Determination | Theory | Found |
|---|---|---|
| Cl, percent by weight | 9.99 | 9.44 |

EXAMPLE IV

To a one liter, four neck flask, equipped with a reflux condenser, addition funnel, stirrer, nitrogen inlet tube and thermometer, containing a solution of 46.4 g. (0.32 mole) 3-hydroxybutyl acrylate 27.4 g. (0.40 mole) pyridine in 100 ml. dry benzene was added, with stirring and in a nitrogen atmosphere, a solution of 34.0 grams (0.174 mole) phenyl phosphonyl dichloride in 50 ml. dry benzene. The addition solution was added dropwise at a temperature below 25° C. The reaction was then refluxed at 70° C. for 1 hour. The reaction mixture was cooled. The precipitate in the reaction mixture was removed by filtration and washed once with dry benzene. The benzene was then vacuum distilled from the filtrate. The resulting liquid was then dissolved in 300 ml. of anhydrous ether. The ether solution was washed with 50 ml. of water a total of three times. The solution was then dried over sodium chloride and vacuum distilled to remove the ether. A viscous, tan colored liquid product was obtained weighing 51.7 grams. A conversion of 79 percent based upon the weight of the final product, was calculated for the final product, di-(3-acryloxybutyl) phenylphosphonate,

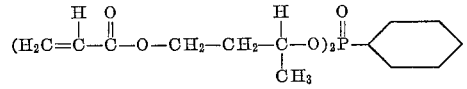

Analysis of the product was as follows:

| Type of Determination | Theory | Found |
|---|---|---|
| $H^3C=\overset{H}{\underset{|}{C}}-COO-$, percent by weight | 34.60 | 32.23 |

Infrared analysis of di-(3-acrylyloxybutyl) phenylphosphonate gave results that were consistent with the desired structure.

EXAMPLE V

Again the general procedure of Example I was followed. A solution of 73 grams (0.375 mole) phenylphosphonyl dichloride in 100 ml. dry benzene was added to a solution 0.75 mole of N-(1,1-dimethyl,2-hydroxyethyl) methacrylamide and 65 grams (0.8 mole) pyridine in about 325 ml. dry benzene. The addition was made at a temperature of 20–25° C. in 30–45 minutes. After the complete addition the reaction mixture was heated at 60° C. for 1 hour. After completion of the reaction, the mixture was cooled, filtered, diluted with benzene and then washed a total of six times with water. The benzene was then stripped from the reaction mixture by vacuum distillation. It was calculated that the resulting product, di-(1,1 - dimethyl,2-methacrylylimidoethyl) phenylphosphonate,

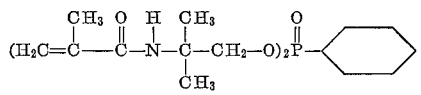

had gone to a 60 percent conversion analysis of the product was as follows:

| Type of Determination | Theory | Found |
|---|---|---|
| N, percent by weight | 6.42 | 6.21 |

Infrared analysis of the product gave results that were consistent with the desired structure. Peaks were obtained at 3.03, 3.30, 3.37, 6.00, 6.15, 6.87, 6.94, 8.05 (broad), 9.80 (broad) microns.

The above example was repeated, except that N-(1,1-dimethyl, 2-hydroxyethyl) methacrylamide was replaced by N-methyl, N-(1,1-dimethyl, 2-hydroxyethyl) methacrylamide. The resulting product, di—[N-methyl-(1,1-dimethyl, 2-methacrylylimidoethyl)] phenylphosphonate

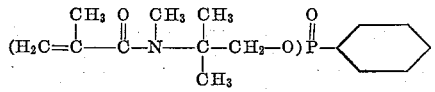

was found to have gone to high conversion. Elemental analysis gave results that were in good agreement with the theoretical.

EXAMPLE VI

One hundred and fifty grams of di-(2-methacrylyloxyethyl) phenylphosphonate was mixed with 1.5 grams tertiary butyl hydroperoxide (1 percent by weight), purged with nitrogen and poured into a 6″ x 6″ x ¼″ cellophaned-lined, open end mold. The samples were then cured in an air oven by heating for 2 hours at 60° C., 3.5 hours at 80° C., 2 hours at 100° C. and finally 1 hour at 120° C., to a clear slightly colored, glassy solid.

EXAMPLE VII

One hundred and twenty grams of tri-(2-methacrylyloxyethyl) phosphate was mixed with 1.2 grams of tertiary butyl hydroperoxide by the procedure of Example VI, except that the sample was heated for 2 hours at 60° C., 4 hours at 80° C., 1 hour at 100° C. and finally 1 hour at 120° C., to a glassy solid.

EXAMPLE VIII

A small amount of di-(2-methacrylyloxyethyl) chloromethyl phosphonate, 88.16 percent purity based upon unsaturation, was mixed with a trace tertiary butyl hydroperoxide and cured at 100° C. for 1 hour to a hard glassy solid.

EXAMPLE IX

Ten grams of di-(2-acrylyloxypropyl) phenylphosphonate was mixed with 0.1 gram tertiary butyl hydroperoxide and cured by the procedure of Example VI, except that the sample was heated for 4 hours at 60° C., 3 hours at 80° C., 16 hours at 100° C. and finally 2 hours at 120° C. to a dark brown cheesy solid.

EXAMPLE X

Seventy-nine grams of di-(1,1-dimethyl,2-methacrylylimidoethyl) phenylphosphonate was mixed with 0.8 gram tertiary butyl hydroperoxide and cured by the procedure of Example VI, except that the sample was heated for 2 hours at 60° C., 4 hours at 80° C., 1 hour at 100° C. and finally 1 hour at 120° C., to a hazy yellow glassy solid.

I claim:

1. A polymerizable monomer having the structure

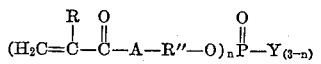

wherein R is a member selected from the group consisting of hydrogen and methyl; A is a member selected from the group consisting of

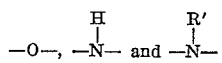

wherein R' is an alkyl group having from 1 to 4 carbon atoms; R″ is a straight chain, branched or cyclic bivalent hydrocarbon radical having from 1 to 6 carbon atoms; Y is a member selected from the group consisting of chlorine, bromine, fluorine, alkyl radicals having from 1 to 6 carbon atoms and aryl radicals having from 6 to 10 carbon atoms; and n is an integer between 2 and 3.

2. A polymerizable monomer of claim 1 wherein A is —O—.

3. A polymerizable monomer of claim 1 wherein A is

4. A polymerizable monomer of claim 1 wherein A is

5. Di-(2-methacrylyloxyethyl) phenylphosphonate.
6. Tri-(methacrylyloxyethyl) phosphate.
7. Di - (2 - methacrylyloxyethyl)choromethylphosphonate.
8. A process for preparing a monomer having the structure

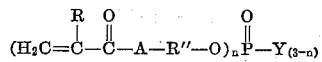

wherein R is a member selected from the group comprising hydrogen and methyl; A is a member selected from the group consisting of

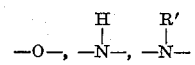

wherein R' is an alkyl group having from 1 to 4 carbon atoms; R″ is a straight chain, branched or cyclic bivalent hydrocarbon radical having from 1 to 6 carbon atoms; Y is a member selected from the group comprising chlorine, bromine, fluorine, and an alkyl radical having from 1 to 6 carbon atoms, and an aryl radical having from 6 to 10 carbon atoms; n is an integer between two and three, which comprises reacting together in the presence of a hydrogen halide remover a compound of the formula

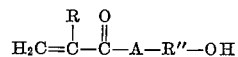

and a compound of the formula

wherein R, A, R', R″ and Y have the above meanings and X represents a member selected from the group comprising chlorine, bromine, and fluorine.

9. A process for prepraing a monomer having the structure

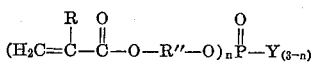

wherein R is a member selected from the group comprising hydrogen and methyl; R″ is a straight chain, branched, or cyclic bivalent hydrocarbon radical having from 1 to 6 carbon atoms; Y is a member selected from the group comprising chlorine, bromine, fluorine, and an alkyl radical having from 1 to 6 carbon atoms, and an aryl radical having from 6 to 10 carbon atoms; n is an integer between two and three, which comprises reacting together in the presence of a hydrogen halide remover a compound of the formula

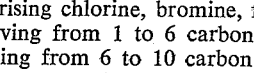

and a compound of the formula

wherein R, R″, and Y have the above meaning and X represents a member selected from the group comprising chlorine, bromine, and fluorine.

10. A process for preparing a monomer having the structure

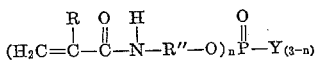

wherein R is a member selected from the group comprising hydrogen and methyl; R'' is a straight chain, branched, or cyclic bivalent hydrocarbon radical having from 1 to 6 carbon atoms; Y is a member selected from the group comprising chlorine, bromine, fluorine, and an alkyl radical having from 1 to 6 carbon atoms, and an aryl radical having from 6 to 10 carbon atoms; $n$ is an integer between two and three, which comprises reacting together in the presence of a hydrogen halide remover a compound of the formula

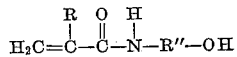

and a compound of the formula

wherein R, R'', and Y have the above meaning and X represents a member selected from the group comprising chlorine, bromine and fluorine.

11. A process for preparing a monomer having the structure

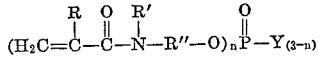

wherein R is a member selected from the group comprising hydrogen and methyl; R' is an alkyl group having from 1 to 4 carbon atoms; R'' is a straight chained, branched, or cyclic bivalent hydrocarbon radical having from 1 to 6 carbon atoms; Y is a member selected from the group comprising chlorine, bromine, fluorine, and an alkyl radical having from 1 to 6 carbon atoms, and an aryl radical having from 6 to 10 carbon atoms, $n$ is an integer between two and three, which comprises reacting together, in the presence of a hydrogen halide remover, a compound of the formula

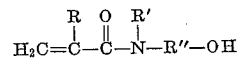

and a compound of the formula

wherein R, R', R'', and Y have the above meanings and X represents a member selected from the group comprising chlorine, bromine, and fluorine.

12. The homopolymer of the polymerizable monomer set forth in claim 1.

13. The homopolymer of the polymerizable monomer set forth in claim 2.

14. The homopolymer of the polymerizable monomer set forth in claim 3.

15. The homopolymer of the polymerizable monomer set forth in claim 4.

References Cited

German printed application 1,100,287, February 1961.

JOSEPH L. SCHOFER, *Primary Examiner.*

H. WONG, *Assistant Examiner.*